Aug. 30, 1932.   J. H. WIGGINS ET AL   1,874,727
LIQUID SEALED VACUUM AND PRESSURE RELIEF VALVE
Filed May 18, 1929   2 Sheets-Sheet 1

INVENTORS:
J. H. WIGGINS.
C. A. TURNER.

By Bakewell & Church
ATTORNEYS

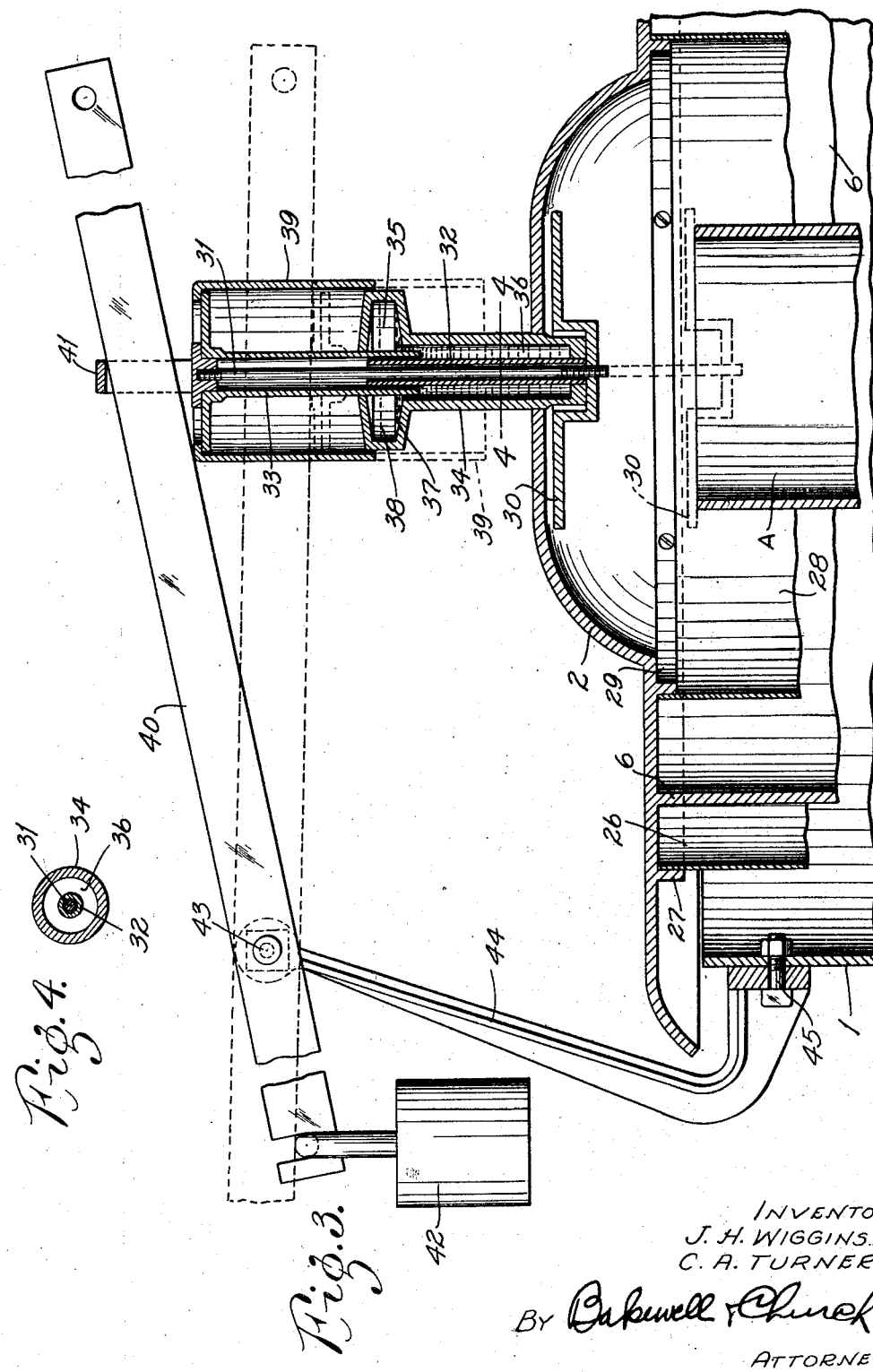

Patented Aug. 30, 1932

1,874,727

UNITED STATES PATENT OFFICE

JOHN H. WIGGINS AND CARROLL A. TURNER, OF TULSA, OKLAHOMA; SAID TURNER ASSIGNOR TO SAID WIGGINS

LIQUID SEALED VACUUM AND PRESSURE RELIEF VALVE

Application filed May 18, 1929. Serial No. 364,196.

Our invention relates to liquid sealed valves of the kind that are used to normally close a passageway through which gas, air or other fluid medium flows under certain conditions.

In a prior patent to one of us, John H. Wiggins, No. 1,651,051, November 29, 1927, there is shown and described a liquid-sealed vacuum and pressure-relief valve for fluid passageways in general but especially adapted for use on large oil storage tanks. The valve of the patent referred to comprises, briefly stated, a sealing compartment of substantially U-shape in cross section, partially filled with a liquid, a reservoir or overflow compartment into which the sealing liquid is discharged from the sealing compartment, whenever said sealing liquid is subjected to a differential pressure of a predetermined degree, and a connection between said sealing compartment and overflow compartment for returning the liquid to the sealing compartment, arranged so that the velocity of the escaping air or gas will produce sufficient static pressure in said connection to eliminate the possibility of said connection allowing liquid to flow from the overflow compartment back into the sealing compartment sooner than desired. The sealing compartment is preferably of annular form in general outline and is arranged between two reservoirs or overflow compartments, one of which is connected with one leg of said sealing compartment by one or more U-shaped tubes arranged at a lower level than the sealing compartment, and the other overflow reservoir being connected with the other leg of the sealing compartment by one or more U-shaped tubes.

Our present invention is directed to certain improvements on the valve of the aforesaid patent and has for one of its objects the provision of overflows for the excess sealing liquid in the reservoirs of the patent referred to. The specific arrangement and construction of the overflow means are such as to prevent the formation of ripples on the surface of the sealing liquid, which would ordinarily affect the overflow so that proper adjustment of the height of the liquid could not be maintained. Further provision is made for causing the excess liquid in the reservoirs to be withdrawn from the bottom instead of from the top and provision is also made for removing the entire excess liquid from only one of the reservoirs, if desired, instead of from both the reservoirs shown in the patent. Also provision is made for collecting the overflow or excess sealing liquid and returning it to the valve when desired, and means is preferably provided for preventing differential pressure set up by the flow of gas through the valve from pumping out liquid through the overflow connection or connections. In a specific embodiment of the invention means is also provided for sealing the overflow tube in the collecting receptacle for the excess liquid and for insuring the maintenance of the seal.

Another object of our invention resides in the provision of a snuffer for the vapor or gas passageway, the snuffer being supported by an actuating lever connected to the valve casing and there being provided liquid sealing means for the rod which passes through the valve wall and operates the snuffer plate.

Still a further object of our invention resides in the provision of means for preventing sealing liquid from being carried by the venting gases along the under side of the valve closure and out of the valve casing.

Still another object of our invention resides in the provision of means for trapping foreign matter contained in the sealing liquid in the overflow reservoirs of the patent referred to and for preventing the return of such foreign matter to the sealing compartment.

Other objects and advantages of our invention will appear from the more detailed description of our improved valve structure.

For a more detailed understanding of our invention, reference will be had to the accompanying drawings in which Fig. 1 is a vertical transverse sectional view of a valve somewhat similar to that of the aforesaid Wiggins patent, but embodying our present improvements, the valve being especially designed for use on oil storage tanks;

Fig. 2 is a horizontal sectional view taken on the line 2—2 of Fig. 1;

Fig. 3 is a vertical transverse sectional view showing the improved sealing arrangement for the snuffer plate rod or shaft as well as the means for supporting the actuating lever on the valve casing; and Fig. 4 is a horizontal sectional view on the line 4—4 of Fig. 3.

In the accompanying drawings, like reference characters refer to like elements of construction throughout the different views.

Referring more particularly to the drawings, A designates a vapor pipe leading from the top of an oil storage tank or other container. As in the prior Wiggins patent referred to, the valve structure in our present invention is such that it normally cuts off communication between the atmosphere and the interior of the tank, permitting gas to escape from the tank through said pipe (A) under certain predetermined conditions of pressure, and permitting air to enter the tank through pipe (A) during the operation of drawing liquid out of the tank.

The valve casing (1) is provided with closure or lid (2) and within the casing is disposed an annular sealing compartment (3). The sealing compartment (3) comprises a trough of U-shape in transverse cross-section as shown, the vertical walls of the trough being of equal height. The inner and outer walls of the trough (3) are provided with lips (4) and (5) respectively (see Figs. 1 and 2) for a purpose hereinafter pointed out. The annular trough or sealing compartment (3) is divided into annular legs (C) and (D) by the annular partition (6) depending from closure (2). The lower edge of the partition (6) is serrated or provided with spaced projections (7) as in the aforesaid Wiggins patent to thereby establish communication between the legs (C) and (D) of the sealing compartment, the spaced projections (7) resting on the bottom of trough (3), thus forming numerous connecting ports or passageways between the two legs of the sealing compartment.

On the inner side of the sealing compartment is an inner reservoir or overflow compartment (E) into which the sealing liquid (X) can escape from leg (C) of the sealing compartment and on the outer side of the sealing compartment is an outer reservoir or overflow compartment (F), into which the sealing liquid may escape from the leg (D) of the sealing compartment.

As in the Wiggins patent referred to, communication is established between the inner reservoir (E) and the leg (D) of the sealing compartment and between the outer reservoir (F) and the leg (C) of the sealing compartment. In the present instance there are provided for this purpose the inverted siphon tubes 8 and 9 respectively at a lower level than the bottom of the sealing compartment. The tube 8 opens into reservoir (E) through port 10 and communicates with leg (D) through port 11 (see Fig. 2) in the lip 5 while tube 9 opens into reservoir (F) through port 12 and communicates with leg (C) through port 12ª in lip 4. By this construction it will be seen that direct communication is established between reservoir (E) and leg (D) and between reservoir (F) and leg (C). In the drawings (see Fig. 2) we have shown the tubes 8 and 9 and associated parts in pairs, but it will be understood that one of each will effectively serve the purpose. In operation the sealing liquid is returned from the inner reservoir or overflow compartment (E) to leg (D) of the sealing compartment by means of inverted siphons 8 and from the outer reservoir or overflow compartment (F) to leg (C) by means of inverted siphons 9.

Normally, the sealing liquid $x$ stands at the same level in the overflow compartments (E) and (F) and in the two legs (C) and (D) of the sealing compartment, as shown in Fig. 1, thereby effectively preventing air from entering the tank through the pipe (A), and preventing gas from escaping from said tank through said pipe. When pressure increases inside of the tank, the sealing liquid in the reservoir (E) and in the leg (C) of the sealing compartment is depressed and the liquid in the leg (D) of the sealing compartment is raised, but not to such a height that it escapes from said leg (D) into the reservoir (F). When the tank pressure has increased to a predetermined degree, the sealing liquid in the leg (D) of the sealing compartment escapes over the upper edge of the trough 3 into the outer overflow compartment (F), said abnormal pressure causing all of the sealing liquid to be discharged from the sealing compartment, and thus leaving said compartment empty, so that the gases can escape freely from the tank without being caused to bubble through liquid. The inverted siphons 8 and 9 are so deep that no normal pressure to which the valve will ever be subjected can unprime them. For example, 1.3 inches hydrostatic head may operate the valve, in which case the inverted siphons would be about 2 inches deep. The velocity, plus static pressure of the escaping gases is exerted on the discharge end of the tubes 9 in a direction tending to prevent the sealing liquid from escaping from the overflow reservoir (F), back through the tubes 9, into the leg (C) of the sealing compartment, until a certain differential pressure is attained, which is less than the differential pressure which opened the valve. Even though the internal pressure of the tank exceeds the predetermined degree at which the sealing liquid starts to escape from the sealing compartment, no gas will escape through the tubes 8 and 9, because the differential pressure at which these tubes will become unprimed is much greater than the differential pressure that effects the discharge of the sealing liquid from the sealing compartment.

When the differential pressure in the tank drops below the pressure at which the sealing liquid started to escape from the sealing compartment, a predetermined amount of the sealing liquid escapes from the overflow reservoir (F) through the tubes 9, back into the sealing compartment and rises therein to such a height as to submerge the lower end portion of the partition 6 in which the connecting ports are formed, thereby cutting off communication between the atmosphere and the tank. During the operation of withdrawing liquid from the tank the differential pressure that is created in the tank by this operation causes the sealing liquid in the leg (C) of the sealing compartment to rise gradually and finally escape from same into the overflow compartment (E) in the same manner that the sealing liquid escapes from the leg (D) of the sealing compartment into the overflow reservoir (F) when an abnormal pressure is created in the tank. Thereafter, when atmospheric pressure is re-established in the tank, the sealing liquid returns from the overflow reservoir (E), back to the sealing compartment, through the U tubes 8.

With the exception of slight differences with respect to the inverted siphon tubes 8 and 9, the construction and operation so far described is substantially the same as that of the aforesaid Wiggins patent. The improvements on the Wiggins valve structure forming the subject matter of our present invention will now be described.

Extending upwardly through the bottom of valve casing (1) into the inner reservoir or overflow compartment (E) is an overflow pipe (13) which extends downwardly through the casing (1) into an overflow receptacle (14). Likewise, extending upwardly into the outer reservoir or overflow compartment (F) is an overflow pipe (15) extending downwardly and communicating with an overflow receptacle (16). The purpose of the overflow pipes and receptacles is to take care of or provide for an abnormal condition or emergency due to an excess of sealing liquid having been placed in the valve casing or having accumulated therein and by raising or lowering the pipes 13 and 15, the height of the liquid in the reservoirs may be suitably adjusted. For manufacturing reasons it is not always desirable to furnish both the inner and outer reservoirs with overflow connections and receptacles and for that reason provision is made for collecting the entire excess of sealing liquid in a single receptacle, preferably one associated with the outer reservoir. By collecting the entire excess in a single receptacle, the use of one receptacle is eliminated and convenient inspection of the entire excess sealing liquid is permitted in one operation. To accomplish this purpose, that is, to draw off the entire excess sealing liquid from the outer reservoir into a single receptacle, the overflow pipe (15) and the overflow receptacle (16) are, as shown in Fig. 1, located respectively at considerably lower points than the overflow pipe (13) and its corresponding receptacle (14).

In the normal operation of the valve, the gas flowing therethrough sometimes swirls and eddies, thereby setting up small waves or ripples on the surface of the sealing liquid in the reservoirs, thereby making uncertain the adjustment of the height of the overflow through pipes 13 and 15. In order to eliminate this defect, it is contemplated by the present invention to provide the overflow pipes (13) and (15) with caps (17) and (18) respectively, to prevent contact of the gas with the liquid overflowing the weirs formed by the tops of the pipes (13) and (15). Contact of the gas and liquid being prevented at these points, the difficulty in adjustment due to waves or ripples is eliminated and accurate adjustment of the liquid level can be made. The lower portions of the caps (17) and (18) are serrated, as shown at (19), to permit the liquid to flow under the caps. Since the liquid has access to the pipes (13) and (15) only by flowing under the lower portions of the caps (17) and (18) respectively, it will be seen that the overflow liquid is removed from the bottoms, rather than from the tops, of the inner and outer reservoirs, this being desirable for a purpose hereinafter pointed out. The overflow receptacles (14) and (16) are adapted for ready detachment from the overflow pipes so that the liquid collected in the receptacles may be poured back into the valve casing when required.

As the gas or vapor is vented from the pipe (A) through the valve casing, there is naturally set up in the reservoirs a pressure which is greater than atmospheric. If the caps (17) and (18) were sealed, this pressure would tend to raise the liquid inside the legs of the caps and to depress the liquid in the reservoirs, thus draining the reservoirs through the overflow pipes sooner than the heights of the overflow pipes would do under ordinary gravity overflow. In other words, under such conditions, the differential pressure set up by the flow of gas through the valve would act to pump the liquid out of the reservoirs through the overflow pipes. In order to equalize the gas or vapor pressure on both sides of the caps (17) and (18), the caps (17) and (18) are provided with openings (20) and (21) respectively, at their upper portions. In this manner, pumping out of the liquid during venting of the gas is prevented since the pressure is equalized on both sides of the caps. The openings (20) and (21) are, as shown, positioned out of alignment with the overflow pipes (13) and (15) respectively, so that if any liquid is splashed upon the caps during venting, such liquid will not drain through the overflow pipes but rather back into the reservoirs.

In order to seal the overflow pipes, the overflow pipe (13), as shown, extends below the surface of the liquid in overflow receptacle (14) which is shown as provided with flange (22) depending from its top, the purpose of this flange being to prevent all the liquid from being poured out of the receptacle (14) during the operation of emptying said receptacle, thereby assuring the retention of sufficient liquid in the receptacle to always provide a seal for overflow pipe (13). Similarly the overflow pipe (15) may terminate below the liquid in receptacle (16) which may also be provided with a flange similar to the flange (22) of receptacle (14). The auxiliary or safety overflow port (23) in pipe (A) is also sealed, this being accomplished by means of cap 24 extending to within a short distance of the bottom of inner reservoir (E) or at least to a point below the tops of openings (10) and (12) of the siphon tubes, which point represents the low limit to which the liquid can be drained from the reservoirs (E) and (F).

In order to trap matter foreign to the sealing liquid such as dirt, rust, or water (if oil constitutes the sealing liquid) and to prevent its access to the sealing compartment, the intake ports (10) and (12) of the siphon tubes (8) and (9) are, as shown, disposed above the bottoms of the reservoirs (E) and (F) respectively. Consequently dirt and rust are retained at the bottoms of the reservoirs and kept out of the siphon tubes and sealing compartment. In case a liquid immiscible with water, such as oil, is used as the sealing liquid, condensation will be trapped out of the sealing compartment, and, if the sealing liquid is such as to float on water, the condensation will deposit at the bottom of the reservoirs where it cannot get back to the sealing compartment in which it might freeze and impair the proper functioning of the device. As the water accumulates at the bottoms of the reservoirs, the overflow pipes (13) and (15) and their corresponding caps (17) and (18) operate to drain the water from the reservoirs into the collecting receptacles. For this reason, the association of the caps (17) and (18) with the overflow pipes is especially desirable in that the caps enable drainage from the bottoms, rather than from the tops, of the reservoirs. Should the siphon tubes (8) and (9) become clogged with foreign matter, they may easily be cleaned by removal of clean-out plugs 25 provided for that purpose.

In normal operation of the device thus far described, the gas or vapor stream escaping from pipe (A) would naturally pass along the under side of closure (2) before discharging through the space between the closure and the top of casing (1). When the valve first opens, sealing liquid would be splashed upon the under side of the closure and the wiping action of the discharging gases would gradually tend to carry away to the periphery of the closure a few drops of the sealing liquid which had previously stuck to the closure. Such drops of sealing liquid would thence drop to the top of the tank connected with pipe (A), with the result that a few drops of sealing liquid would be lost after each opening of the valve. In order to eliminate such gradual loss of sealing liquid, we have provided annular baffle (26) bolted, as shown, on the upstream side of an annular bead (27) depending from and preferably integral with the closure (2). Consequently, any sealing liquid which is splashed onto the closure (2) during opening of the valve is all on the upstream side of bead (27) with the result that no sealing liquid can be carried out of the valve casing by the gas stream and lost. In like manner, an annular baffle 28 is bolted to the annular bead (29) on the opposite side of the sealing compartment (3) so that sealing liquid will not be carried along by the air stream flowing inwardly through the valve casing when liquid is being withdrawn from the tank associated with pipe (A).

Referring now to the snuffer for the vapor passageway and to the sealing means for the rod which supports the same, particularly shown in Fig. 3, (30) indicates a snuffer plate adapted to move vertically downward on to the top of pipe (A) to form a gastight closure therefor as shown in dotted lines in Fig. 3. At (31) is shown the rod or shaft to which the snuffer plate is attached, and said rod or shaft passes freely through a cylinder (32). Telescoped with the cylinder (32) is a second cylinder (33), and in telescopic arrangement with the latter is a third cylinder (34), the upper portion of which is enlarged to form a reservoir (35). As will be seen from the drawings, the cylinders (32) and (34) are stationary, while the cylinder (33) is movable with the rod or shaft (31). The chamber formed between the cylinders (32) and (34) is filled with mercury (36), the normal liquid level of which, when the snuffer plate is in the upper position, is shown at (37). The cylinder (33) thereby forms a seal with the mercury (36) between the inside of the valve casing and the atmosphere, and when the shaft (31) and cylinder (33) are moved downwardly to close pipe (A) by snuffer (30), the sealing liquid (36) rises in reservoir (35) to the position shown by dotted line (38). By providing the reservoir (35) at the top of cylinder (34), the length of the cylinders is thereby considerably reduced, and by reason of the fact that the top of the reservoir is almost entirely closed, splashing out of the sealing liquid or mercury is prevented when the snuffer plate is suddenly operated. The sealing device just described may, if desired, be provided with a weather hood (39). The rod or shaft (31) and its associated cylinder (33) are moved vertically by means of the actuating lever (40) and stirrup (41), the actuating lever carrying a counterweight (42) at one end and pivoted at (43). The actuating lever (40) is supported by supporting arm (44) bolted to the valve casing (1) as shown at (45).

Having thus described our invention, what we claim as new and desire to secure by Letters Patent is:

1. In a valve of the class described, a sealing compartment provided with a sealing liquid, an overflow reservoir into which the sealing liquid escapes under certain conditions, means for permitting the sealing liquid to return automatically from the overflow reservoir to the sealing compartment, and an independent means for automatically withdrawing excess sealing liquid from the overflow reservoir.

2. In a valve of the class described, a sealing compartment provided with a sealing liquid, an overflow reservoir into which the sealing liquid escapes under certain conditions, means for permitting the sealing liquid to return automatically from the overflow reservoir to the sealing compartment, an overflow pipe extending upwardly through the bottom of said reservoir, and means for causing excess sealing liquid to be removed automatically from the bottom of said reservoir through said overflow pipe.

3. In a valve of the class described, a sealing compartment provided with a sealing liquid, an overflow reservoir into which the sealing liquid escapes under certain conditions, means for permitting the sealing liquid to return automatically from the overflow reservoir to the sealing compartment, an overflow pipe extending upwardly through the bottom of said reservoir, a cap surrounding said overflow pipe and supported on the bottom of the reservoir, and openings in the lower portion of said cap.

4. In a valve of the class described, a sealing compartment provided with a sealing liquid, an overflow reservoir for the sealing liquid, means for establishing communication between the sealing compartment and the reservoir, an overflow pipe extending upwardly through the bottom of the reservoir, a cap surrounding said overflow pipe and supported on the bottom of the reservoir, openings in the lower portion of said cap, and a perforation in the upper portion of said cap to equalize the pressure on both sides thereof.

5. A valve as defined in claim 4 in which said perforation in the upper portion of the cap is disposed out of alignment with the overflow pipe.

6. In a valve of the class described, a sealing compartment provided with a sealing liquid, an overflow reservoir for the sealing liquid, a tube for establishing communication between the sealing compartment and the reservoir, the reservoir end of said tube terminating at a point above the bottom of the reservoir so that foreign matter will be retained at the bottom of the reservoir, and means for permitting liquid at the bottom of the reservoir to escape automatically from said reservoir.

7. In a valve of the class described, a U-shaped sealing compartment provided with a sealing liquid, means for dividing said sealing compartment into communicating legs, a separate overflow reservoir for each of said legs, means for establishing communication between the reservoirs and the respective legs of the sealing compartment, and independent overflow devices combined with the respective overflow reservoirs for automatically removing excess liquid from said reservoirs.

8. In a valve of the class described, a sealing compartment provided with a sealing liquid, an overflow reservoir for the sealing liquid, means for establishing communication between the sealing compartment and the reservoir, an overflow pipe extending upwardly through the bottom of the reservoir, means for causing excess sealing liquid to be removed from the bottom of the reservoir through said overflow pipe, a receptacle detachably connected to said overflow pipe for collecting excess sealing liquid, the overflow pipe extending to a point in proximity to the bottom of said receptacle to thereby seal the overflow pipe in the liquid contained in said receptacle, and means for preventing the entire liquid contents of said receptacle from being poured out.

9. In a valve of the class described, a sealing compartment provided with a sealing liquid, an overflow reservoir into which the sealing liquid can escape from the sealing compartment under certain conditions, means for permitting the sealing liquid to return automatically from the overflow reservoir back to the sealing compartment, an overflow pipe in said reservoir adapted to serve as an outlet for excess liquid in said reservoir, and a means combined with said overflow pipe for causing the excess liquid that enters said overflow pipe to be withdrawn from the bottom of said reservoir.

JOHN H. WIGGINS.
CARROLL A. TURNER.